(12) United States Patent
Fauteux

(10) Patent No.: US 7,000,443 B2
(45) Date of Patent: Feb. 21, 2006

(54) APPARATUS AND METHOD FOR FOLDING A SHEET MATERIAL

(75) Inventor: Denis G. Fauteux, Deerfield Beach, FL (US)

(73) Assignee: Eldor Corporation, (IT)

( * ) Notice: Subject to any disclaimer, the term of this patent is extended or adjusted under 35 U.S.C. 154(b) by 0 days.

(21) Appl. No.: 10/649,319

(22) Filed: Aug. 27, 2003

(65) Prior Publication Data
US 2005/0044918 A1   Mar. 3, 2005

(51) Int. Cl.
B21D 5/16   (2006.01)

(52) U.S. Cl. .......................... 72/310; 72/311; 72/379.6

(58) Field of Classification Search .................. 72/310, 72/311, 308, 385, 379.6
See application file for complete search history.

(56) References Cited

U.S. PATENT DOCUMENTS

| | | | | |
|---|---|---|---|---|
| 38,115 A | * | 4/1863 | Morgan | 72/310 |
| 308,349 A | * | 11/1884 | Fairchild | 72/310 |
| 316,461 A | * | 4/1885 | Huber | 72/310 |
| 590,264 A | * | 9/1897 | Irons | 72/310 |
| 671,312 A | * | 4/1901 | Delachartre | 72/310 |
| 2,086,736 A | * | 7/1937 | Palmer | 72/385 |
| 3,430,478 A | * | 3/1969 | Arnold | 72/298 |
| 4,100,787 A | * | 7/1978 | Straza et al. | 72/310 |
| 4,594,868 A | * | 6/1986 | Takeuchi et al. | 72/18.1 |
| 6,021,657 A | * | 2/2000 | Finn et al. | 72/307 |

* cited by examiner

Primary Examiner—Daniel C. Crane
(74) Attorney, Agent, or Firm—Factor & Lake

(57) ABSTRACT

Apparatus and method for folding a sheet material, preferably an electrode sheet, into a fan-fold orientation. A securement means secures a portion of the sheet material to a rotatable plate in a plane parallel to the rotatable plate. A rotatable releasable clamp secures at least a portion of the sheet in a first rotational position between the plate and clamp. A rotation means rotates the securement means, plate, and clamp so as to move the sheet from the first rotational position to a second rotational position, wherein, rotation from the first rotational position to the second rotational position forms a folded portion of the sheet over a portion of the clamp.

16 Claims, 3 Drawing Sheets

APPARATUS AND METHOD FOR FOLDING A SHEET MATERIAL

BACKGROUND OF THE INVENTION

1. Field of the Invention

The present invention relates in general to an apparatus and a method for folding a sheet material, and more specifically to an apparatus for fan-folding an electrode sheet and a method of the same.

2. Prior Art

The use of fan-folded lithium based cells is known in the art. Generally, fan-fold lithium based cells comprise a single layered material (including a current collector, anode, cathode and separator) which are "fan-folded" (i.e. accordion folded) to define a stack of cells in a zig-zag configuration. While such fan-fold cells are known, there have been notable difficulties associated with their manufacture.

There are a number of known methods of manufacturing fan-fold batteries, none of which have been adequate to date. Winding manufacturing processes do not allow the production of free form batteries. And while some free form batteries may be produced using a stacking manufacturing process, the number of configurations is still limited and the stacking process is inherently slow. Other conventional processes for manufacturing fan-fold cells are known, but such processes are also slow, inefficient, and often damage the finished product. For example, conventional processes do not maintain the electrode assembly in a fixed position so as to prevent displacement during the manufacturing process. This displacement often results in inaccurate folding and damage to current collector material at the folding line. Additionally, other processes do not provide mechanical support at the folding line of the electrode assembly, thus the current collector does not fold according to the folding direction and is damaged.

Accordingly, it is an object of the present invention to provide an apparatus and a method for folding a sheet material, preferably an electrode sheet, which enables the rapid production of fan-fold batteries, substantially free of defects.

These and other objects will become apparent in light of the present specification, drawings and claims appended hereto.

SUMMARY OF THE INVENTION

The present invention is directed to an apparatus for folding a sheet material, preferably an electrode sheet, into a fan-fold orientation. The apparatus includes a securement means for securing at least a portion of the sheet material to a rotatable plate in a plane parallel to the plate. A rotatable releasable clamp is associated with the plate, preferably on a side of the plate, to secure an article in a receiving space between the plate and clamp. A rotation means is associated with the clamp, plate, and securement means to enable rotation thereof.

In one embodiment, the securement means includes a second rotatable releasable clamp having a plurality of extension members. The second clamp may secure at least a portion of the sheet material between at least two of the extension members. In a preferred embodiment, the securement means is a vacuum plate which secures at least a portion of the sheet material to the vacuum plate via a sucking force.

The apparatus further includes sliding means, repositioning means, and pressing means, all of which are associated with the clamp and the rotation means. The sliding means may comprise any conventional structure which enables the clamp to move out and away from one position to another position in a single plane.

In a preferred embodiment, the repositioning means comprises any conventional structure which enables the clamp to be repositioned from one position to another in multiple planes.

In another preferred embodiment, the pressing means comprises any conventional structure which enables the clamp to selectively move inward and outward with respect to a top surface of the plate.

In a preferred embodiment of the present invention, the apparatus further includes a returning means, which similar to the rotation means, is associated with the clamp, plate, and securement means to enable rotation thereof.

The present invention is also directed to a method for folding a sheet material comprising the steps of:

a) providing a means for securing at least a portion of a sheet material to a rotatable plate in a plane parallel to the plate;

b) providing a rotatable releasable clamp for securing at least a portion of the sheet in a first rotational position between the plate and clamp; and c) rotating the clamp, plate, and securement means so as to move the sheet from the first rotational position to a second rotational position, wherein, rotation from the first rotational position to the second rotational position forms a folded portion of the sheet over a portion of the clamp.

In one embodiment, the step of providing a securement means includes the step of providing a second rotatable releasable clamp having a plurality of extension members to secure at least a portion of the sheet material to the plate. Preferably, the sheet is secured to the plate between at least two of the members in a plane parallel to the plate. In a preferred embodiment, the step of providing a securement means includes the step of providing a vacuum plate for securing at least a portion of a sheet material to the rotatable plate in a plane parallel to the rotatable plate.

In a preferred embodiment, the method further includes the steps of sliding the clamp out and away from the folded portion, repositioning the clamp on an outer portion of the folded portion, pressing the sheet inward toward the plate to crease the folded portion, and returning the sheet to the first or second rotational position from the other of the first or second rotational position to form a subsequent folded portion.

Preferably, the sheet material is an electrode sheet having an anode active material and a cathode active material adhered to an anode and a cathode side of a separator respectively. The apparatus forms a plurality of folds in the electrode sheet to produce a battery having a fan-fold (zig-zag) configuration. The method may include the step of removing active material from a surface of the folded portions to produce a fan-fold battery having gaps of active material at the folded portions.

BEST MODE FOR PRACTICING THE INVENTION

Figure 1:
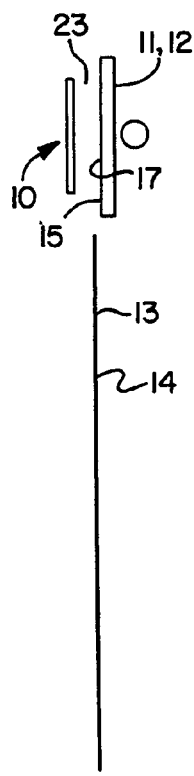
FIG. 1 of the drawings is a side view of the folding apparatus of the present invention.

While this invention is susceptible of embodiment in many different forms, there is shown in the drawings and will be described in detail, several specific embodiments with the understanding that the present disclosure is to be considered as an exemplification of the principles of the invention and is not intended to limit the invention to the embodiments illustrated.

Folding apparatus 10 is shown in FIG. 1 as including securement means 12, plate 11, clamp 16, and rotation means 20 for folding sheet 14. The securement means secures bottom surface 13 of sheet 14 to a top surface 17 of plate 11. In a preferred embodiment, the securement means is a vacuum plate which includes plate 11 and an integral vacuum assembly. Preferably, there is one vacuum plate; however, a plurality of vacuum plates may be used. It is contemplated that the vacuum plate comprise a conventional vacuum plate, or any other suitable structure capable of drawing at least a portion of the sheet to a surface of a plate and preventing displacement thereof.

In another preferred embodiment, the securement means includes a second clamp which is rotatable and releasable. The second clamp includes a plurality of extendable members for securing sheet 14 to plate 11 between at least two of the members. It is contemplated the second clamp and rotatable releasable clamp 16 may be an integral component, or alternatively may be separate parts.

Figure 2:
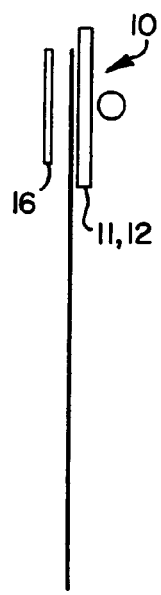
FIG. 2 of the drawings is another side view of the folding apparatus of the present invention.
Figure 3:
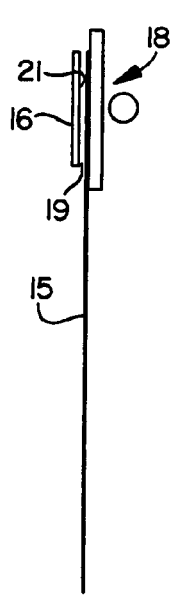
FIG. 3 of the drawings is a side view of the folding apparatus of the present invention showing a sheet secured between a clamp and a securement means.

Rotatable releasable clamp 16, as shown in FIGS. 2–3, is associated with plate 11 on at least one side thereof. Preferably, clamp 16 includes clamp plate 19 having a smooth, flat, front face 21 which may contact top surface 15 of sheet 14. The clamp and plate 11 are aligned such that there is receiving space 23 between top surface 17 of plate 111 and top surface 15 of sheet 14. The clamp plate includes at least one flat edge in which the sheet can be folded over. It is contemplated that clamp 16 is a conventional clamp, or may be any other suitable device for securing an article.

Figure 4:
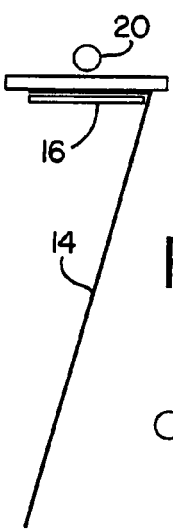
FIG. 4 of the drawings is a side view of the folding apparatus of the present invention showing rotation of the clamp, plate, and securement means to form a fold in the sheet.
Figure 5:
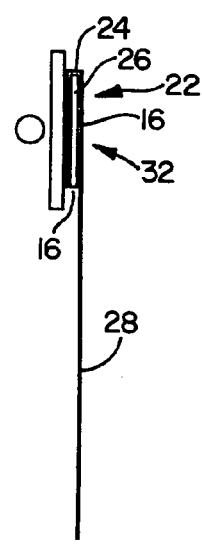
FIG. 5 of the drawings is a side view of the folding apparatus of the present invention showing further rotation of the clamp, plate, and securement means to form a folded portion in the sheet.

Rotation means 20, as shown FIGS. 3–5, rotates clamp 16, plate 11, and securement means 12, preferably simultaneously, so as to move sheet 14 from first rotational position 18, as shown in FIG. 3, to second rotational position 22, as shown in FIG. 5. The rotation means is associated with clamp 16, plate 11, and securement means 12 on at least one side thereof. It is contemplated that the rotation means is any conventional structure for enabling rotation of an assembly having multiple parts, as would be readily understood to those having ordinary skill in the art.

Figure 6:
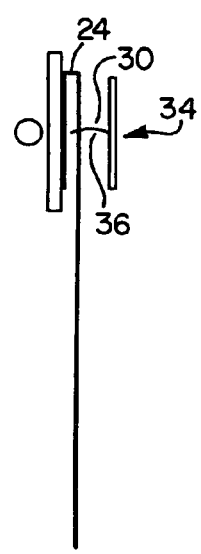
FIG. 6 of the drawings is a side view of the folding apparatus of the present invention showing repositioning of the clamp on the outside of the new folded portion.

Folding apparatus 10 further includes sliding means 30, repositioning means 36, and pressing means 38 as shown in FIGS. 6–9. Sliding means 30, as shown in FIG. 6, enables clamp 16 to move out and away in a single plane from a previous location. The sliding means is associated with clamp 16 and rotation means 20. It is contemplated that the sliding means is any conventional structure which slides an element from one position to at least a second position, as would be readily understood to those having ordinary skill in the art.

Repositioning means 36, as shown in FIG. 6, repositions clamp 14 from one position to a second position in more than one plane. The repositioning means is also associated with clamp 16 and rotation means 20. It is contemplated that the repositioning means is any conventional structure which moves an element from a first position to a second position in more than one plane, as would be readily understood to those having ordinary skill in the art.

Figure 7:
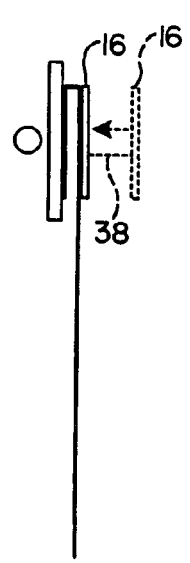
FIG. 7 of the drawings is a side view of the folding apparatus of the present invention showing the clamp pressing on the outside of the new folded portion.

Pressing means 38, as shown in FIG. 7, allows movement of the clamp inward and outward in a plane parallel to the top surface of plate 11. The pressing means is also associated with clamp 16 and rotation means 20. It is contemplated that the pressing means is any conventional structure which enables the clamp to move inward and outward in a single plane, as would be readily understood to those having ordinary skill in the art.

Figure 8:
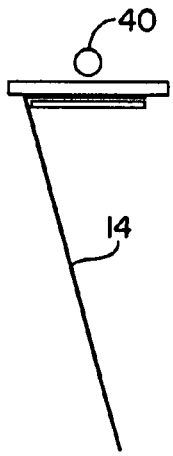
FIG. 8 of the drawings is a side view of the folding apparatus of the present invention showing rotation of the clamp, plate, and securement means to form a subsequent folded portion of the sheet.
Figure 9:
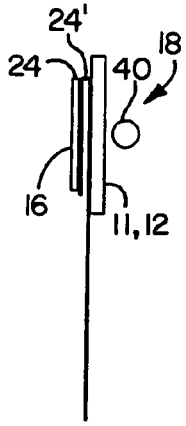
FIG. 9 of the drawings is a side view of the folding apparatus of the present invention showing further rotation of the clamp, plate, and securement means to form a subsequent folded portion of the sheet.

Additionally, folding apparatus 10 further includes returning means 40, as shown in FIGS. 8–9, which is associated with clamp 16, plate 11, and securement means 12. The returning means enables the sheet to return from either first rotational position 18 or second rotational position 22 to the other of the first or second rotational position. It is contemplated that the returning means is any conventional structure for enabling rotation of an assembly or single component, as would be readily understood to those having ordinary skill in the art.

Figure 10:
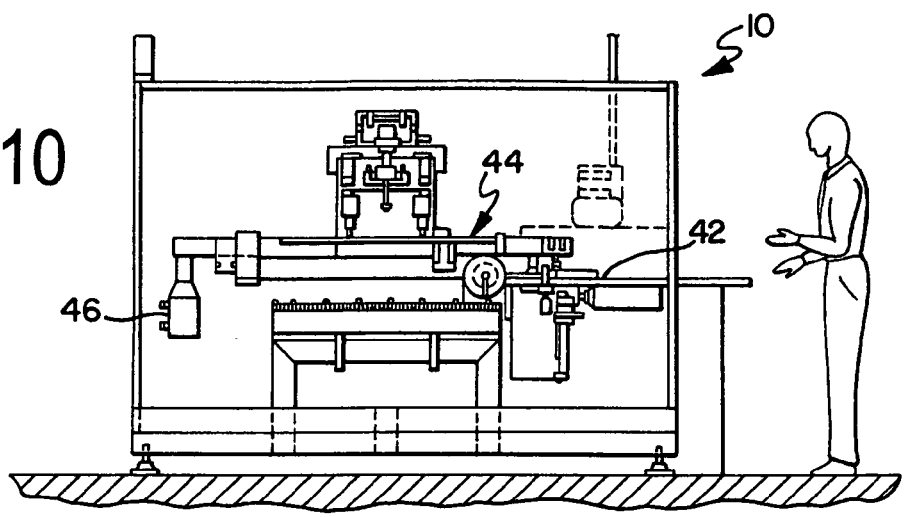
FIG. 10 of the drawings is a side view of the folding apparatus of the present invention.
Figure 11:
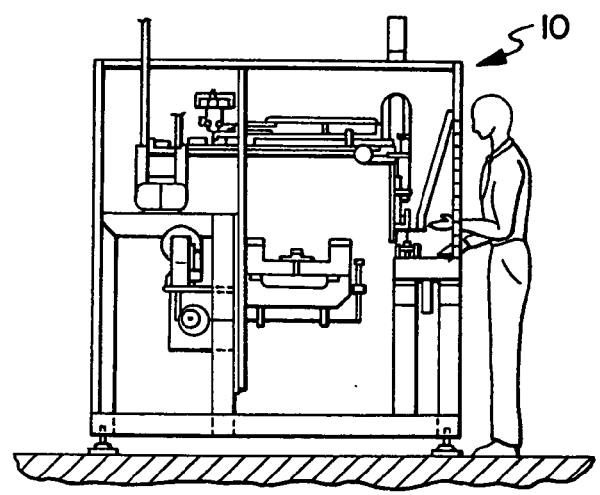
FIG. 11 of the drawings is another side view of the folding apparatus of the present invention.
Figure 12:
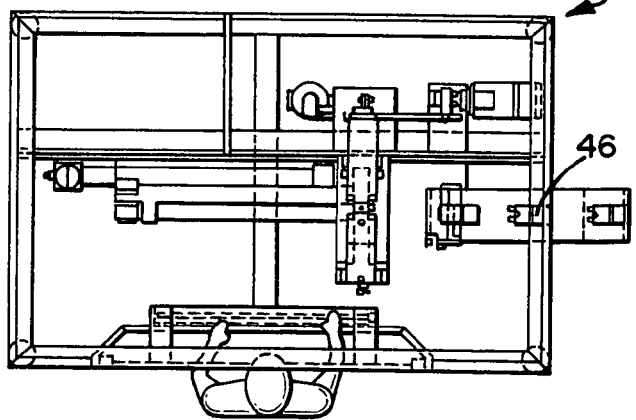
FIG. 12 of the drawings is a top perspective view of the of the folding apparatus of the present invention.

In a preferred embodiment of folding apparatus 10, the apparatus includes inlet 42 at one end for introducing the sheet material, as shown in FIGS. 10–12. Feeding means 44 is disposed along a length of the apparatus to move sheet 14 through the apparatus and prevent displacement thereof. The feeding means preferably comprises guide pins, rollers, or any other suitable structure for moving the sheet through the apparatus, as would be readily understood to those having ordinary skill in the art. Folding apparatus 10 also includes outlet end 46 where the folded sheet may be removed from the apparatus.

The apparatus may further include a tail securing means (not shown) for further preventing displacement of the sheet as it moves through the apparatus. The tail securing means is preferably a slidable clip or clamp which secures the tail end of the sheet as it moves through folding apparatus 10, but may be any other suitable structure.

In operation, sheet 14 is fed into folding apparatus 10 through inlet 42 (generally shown in FIGS. 10–12). The sheet is secured and moved forward through the folding apparatus via feeding means 44 until it reaches receiving space 23 between plate 11 and clamp 16 as shown in FIGS. 1–2. Bottom surface 13 of sheet 14 is drawn to top surface 17 of plate 11 by securement means 12, which is preferably a vacuum plate. The clamp is then closed to secure the sheet in a first rotational position, as shown in FIG. 3. When the clamp is closed, front face 21 of the clamp is in contact with top surface 15 of the sheet. The sheet is then ready to be folded.

A preferred embodiment of the method of folding sheet 14 is shown in FIGS. 3–9. Rotation means 20 rotates clamp 16, plate 11, and securement means 12, as shown in FIGS. 3–5, from first rotational position 18, as shown in FIG. 3, to second rotational position 22, as shown in FIG. 5, wherein, rotation from first rotational position 18 to second rotational position 22 forms first folded portion 24 of the sheet over a portion of the clamp.

Subsequently, the clamp is slid out and away from first folded portion 24, as shown in FIG. 6. The clamp is then repositioned on an outer portion of the first folded portion (also shown in FIG. 6). To crease the first folded portion, the clamp is pressed inward with sufficient force on the outer portion of the folded portion, as shown in FIG. 7. As shown in FIGS. 8–9, second folded portion 24' is formed by returning clamp 16, plate 11, and securement means 12 to the first rotational position from the second rotational position.

Folding apparatus 10 may additionally form a subsequent third folded portion (not shown) in the sheet. To form the third folded portion, the clamp is slid out and away from the second folded portion, repositioned on an outer portion of the second folded portion, and pressed inward on the second folded portion to crease the second folded portion. Subsequently, the clamp, plate, and securement means are rotated to the second rotational position from the first rotational position. The rotation to the second rotational position from the first rotational position forms the third folded portion.

Folding apparatus 10 may further crease the third folded portion and form a fourth folded portion (not shown) if so desired. To do so, the clamp is slid out and away from the third folded portion, repositioned on an outer portion of third folded portion, and pressed inward on the third folded portion to crease the third folded portion. Next, the clamp, plate, and securement means are rotated to the first rotational position from the second rotational position. The rotation to the first rotational position from the second rotational position forms the fourth folded portion. It is contemplated that folding apparatus 10 may fold any predetermined number of folded portions in sheet 14. It is similarly contemplated that folding apparatus 10 may be adjusted to yield folded portions of different sizes.

Figure 13:
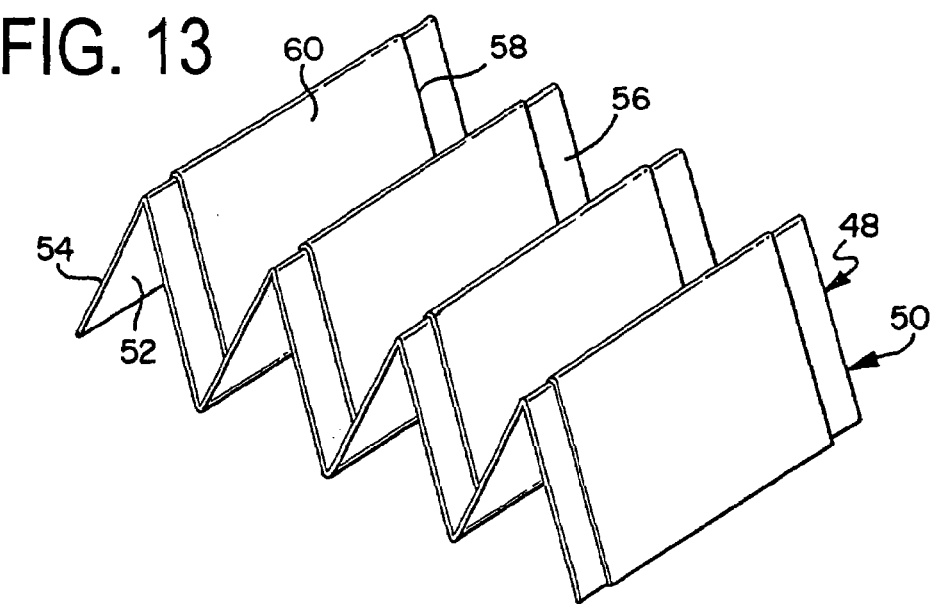
FIG. 13 of the drawings is a perspective view of the electrode assembly of the present invention.
Figure 14:
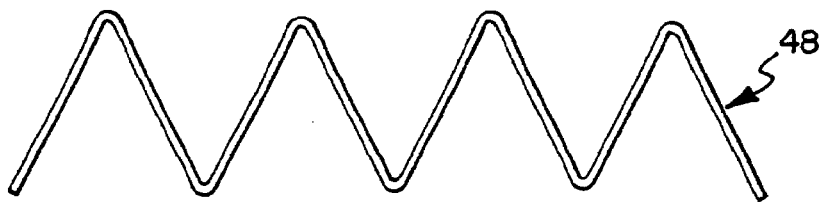
FIG. 14 of the drawings is a side, elevated view of the electrode assembly of the present invention.
Figure 15:
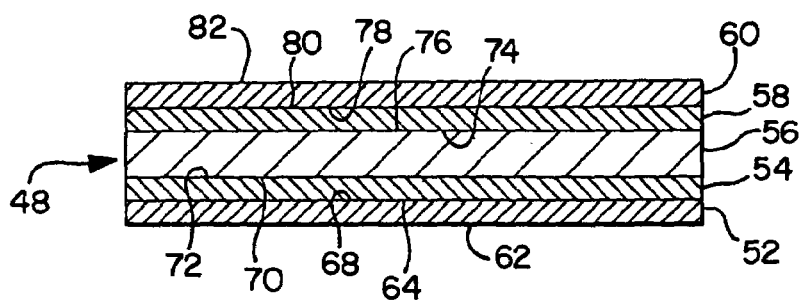
FIG. 15 of the drawings is a cross-sectional view of the electrode assembly of the present invention.

The above preferred embodiment may be practiced on electrode sheet 50 (as the sheet 14 material) to form fan-folded battery 48, as shown in FIGS. 13–15. Electrode sheet 50 preferably includes anode current collector 52, anode active material 54, separator 56, cathode active material 58, and cathode current collector 60.

A cross-section of the electrode sheet is shown in FIG. 15. Anode current collector 60 includes upper surface 62 and lower surface 64. The anode current collector may comprise a metal such as copper or the like. Anode active material 54 includes upper surface 68 and lower surface 70. Separator 56 includes anode surface 72 and cathode surface 74. Cathode active material 58 includes upper surface 76 and lower surface 78. Cathode current collector 60 includes upper surface 80 and lower surface 82. The cathode current collector may comprise a conductive metal, such as aluminum or the like. The anode, cathode and current collector may comprise any number of different conventional and proprietary materials.

The electrode sheet is arranged such that anode surface 72 of separator 56 is associated with lower surface 70 of anode active material 66, and cathode surface 74 of separator 56 is associated with upper surface 76 of cathode active material 58. Lower surface 70 is preferably associated with anode surface 72 and upper surface 76 is preferably associated with cathode surface 74 via an adhesive, or any other suitable means. In addition, the respective active material and current collector are coextent (i.e., they overlie each other and have substantially the same surface area). In turn, upper surface 68 of anode active material 66 is associated with lower surface 64 of anode current collector 52. Similarly, lower surface 78 of cathode active material 58 is associated with upper surface 80 of cathode current collector 60. Separator 56 is substantially contiguous about the entire length of electrode assembly 50.

Anode current collector 52 and cathode current collector 20 are not as wide as separator 16, anode active material 14 and anode current collector 12. Preferably, the surface area covered by the anode active material is greater than that of the cathode active material which results in improved performance and a lower likelihood of dendrite growth and shorting.

Folding apparatus 10 may form a predetermined number of folded portions in electrode sheet 50 to produce zig-zag folded battery 48 having the configuration shown in FIGS. 13–14. Preferably, the resulting battery has portions of the active material removed at folded portions via a removing means which removes the active material from a surface of the folded portions. The removing means may comprise a laser, a solvent, or any other means of removing the active material from the electrode sheet. It is contemplated that the removing means may be integrated into apparatus to produce a fan-fold battery having gaps of active material at the folded portions.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An apparatus for folding a sheet material comprising:
   means for securing at least a portion of the sheet material to a rotatable plate in a plane parallel to the rotatable plate;
   a rotatable releasable clamp for securing at least a portion of the sheet in a first rotational position between the plate and clamp; and
   means for rotating the securement means, plate, and clamp so as to move the sheet from the first rotational position to a second rotational position, wherein, rotation from the first rotational position to the second rotational position forms a folded portion of the sheet over a portion of the clamp; and
   means for returning the sheet to the at least one of the first rotational position and second rotational position to form an additional folded portion.

2. The apparatus according to claim 1, wherein the securement means includes at least one vacuum plate to secure at least a portion of the sheet to the rotatable plate.

3. The apparatus according to claim 1, further including means for sliding the clamp out and away from the folded portion.

4. The apparatus according to claim 3 further including means for repositioning the clamp on an outer portion of the folded portion.

5. The apparatus according to claim 4, further including means for pressing the sheet inward toward the plate to crease the folded portion.

6. The apparatus according to claim 1, further including means for maintaining the secured portion of the sheet from the first rotational position in parallel relation to at least a portion of an unsecured portion of the sheet when a portion of the sheet from the first rotational position is folded over the clamp to the second rotational position.

7. The apparatus according to claim 1, wherein the sheet material comprises an electrode sheet having at least one of an anode active material and a cathode active material disposed on at least one of a top surface and a bottom surface thereof.

8. The apparatus according to claim 7, further including means for removing active material from at least one of the top surface and bottom surface of the folded portion of the electrode sheet.

9. A method for folding a sheet material comprising the steps of:
providing a means for securing at least a portion of the sheet material to a rotatable plate in a plane parallel to the plate;
providing a rotatable releasable clamp for securing at least a portion of the sheet in a first rotational position between the plate and clamp;
rotating the clamp, plate, and securement means and sheet so as to move the sheet from the first rotational position to a second rotational position, wherein, rotation from the first rotational position to the second rotational position forms a folded portion of the sheet over a portion of the clamp; and
returning the sheet to the at least one of the first rotational position and second rotational position to form an additional folded portion.

10. The method according to claim 9, wherein the step of providing a securement means includes the step of providing a vacuum plate for securing at least a portion of the sheet material to the rotatable plate.

11. The method according to claim 9, further including the step of sliding the clamp out and away from the folded portion.

12. The method according to claim 11, further including the step of repositioning the clamp on an outer portion of the folded portion.

13. The method according to claim 12, further including the step of pressing the sheet inward toward the plate to crease the folded portion.

14. The method according to claim 9, further including the step of maintaining the secured portion of the sheet from the first rotational position in parallel relation to at least a portion of an unsecured portion of the sheet when a portion of the sheet from the first rotational position is folded over the clamp to the second rotational position.

15. The method according to claim 9, wherein the sheet material comprises an electrode sheet having at least one of an anode active material and a cathode active material disposed on at least one of a top surface and a bottom surface thereof.

16. The method according to claim 15, further including the step of removing active material from at least one of the top surface and bottom surface of the folded portion of the electrode sheet.

* * * * *